US008868390B2

(12) United States Patent
Enchery (10) Patent No.: US 8,868,390 B2
(45) Date of Patent: Oct. 21, 2014

(54) METHOD OF DEVELOPING A PETROLEUM RESERVOIR FROM A FLOW MODEL CALIBRATED THROUGH PRESSURE AND SATURATION MAP SCALING

(75) Inventor: Guillaume Enchery, Rueil-Malmaison (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 265 days.

(21) Appl. No.: 13/315,333

(22) Filed: Dec. 9, 2011

(65) Prior Publication Data

US 2012/0158378 A1 Jun. 21, 2012

(30) Foreign Application Priority Data

Dec. 15, 2010 (FR) ...................................... 10 04890

(51) Int. Cl.
*G06G 7/48* (2006.01)
*E21B 43/00* (2006.01)
*G01V 11/00* (2006.01)
(52) U.S. Cl.
CPC ................ *E21B 43/00* (2013.01); *G01V 11/00* (2013.01)
USPC .......................................................... 703/10
(58) Field of Classification Search
USPC .......................................................... 703/10
See application file for complete search history.

(56) References Cited

U.S. PATENT DOCUMENTS 7,752,022 B2 7/2010 Fornel et al.

FOREIGN PATENT DOCUMENTS

EP 1 728 967 A1 12/2006

OTHER PUBLICATIONS

Eymard et al.; Mathematical Study of a Petroleum-Engineering Scheme; ESAIM: M2AN ESAIM: Mathematical Modelling and Numerical Analysis M2AN, vol. 37, No. 6, 2003, pp. 937-972.*
Enchéry et al.; Numerical Approximation of a Two-Phase Flow Problem in a Porous Medium with Discontinuous Capillary Forces; SIAM Journal on Numerical Analysis vol. 43, No. 6 (2006), pp. 2402-2422.*
Enchery (inventor) et al.: An Improved Pressure and Saturation Downscaling Process for a Better Integration of 4D Seismic Data Together with Production History; SPE 107088; 2007; pp. 1-7.*
G. Enchery, et al: "An Improved Pressure and Downscaling Process for a Better Integration of 4D Seismic Data Together with Prodution History", SPE, vol. SPE, No. 107088, Jun. 11, 2007, pp. 1-7, XP007918941.

(Continued)

*Primary Examiner* — Hugh Jones
(74) *Attorney, Agent, or Firm* — Antonelli, Terry, Stout & Kraus, LLP.

(57) ABSTRACT

A method of developing a petroleum reservoir from a flow model constrained by production data and seismic data is disclosed. It is used to define a development scheme and to start or continue the reservoir development. Production data and seismic data associated with a fine grid are acquired during the development of the reservoir. Production data, as well as pressure and saturation values, are simulated in each cell of the flow model. A pressure value and a saturation value are assigned to each cell of the fine grid. A pressure equation is therefore solved locally on the fine grid and the saturations are calculated by writing the continuity of the phase flows between neighboring lithofacies, the conservation of the pore volume and the conservation of the phase volume. The maps obtained are then used to simulate seismic data.

27 Claims, 6 Drawing Sheets

(56) References Cited

OTHER PUBLICATIONS

M. Le Ravalec-Dupin, et al: "Pre-Selection of Resrevoir Models from a Geostatistics-Based Petrophysical Seismic Inversion", SPE 131310, vol. SPE, 131310, Jun. 14, 2010, pp. 1-12, XP007918942.

G. Enchery et al: "A New Parameterization Technique for the Calibration of Facies Proportions in History Matching Processes", ECMOR, vol. ECMOR XII, No. B009, Sep. 6, 2010, pp. 1-13, XP007918943.

O. Lerat, et al: "Construction of a Stochastic Geological Model Constrained by High-Resolution 3D Seismic Data—Application of the Girassol Field Offshore Angola", SPE International Oil and Gas Conference and Exhibition, Nov. 11, 2007, pp. 1-16, XP002568891.

\* cited by examiner

METHOD OF DEVELOPING A PETROLEUM RESERVOIR FROM A FLOW MODEL CALIBRATED THROUGH PRESSURE AND SATURATION MAP SCALING

BACKGROUND OF THE INVENTION

1. Field of the Invention

The present invention relates to the petroleum industry and more particularly to the development of underground reservoirs such as petroleum reservoirs or gas storage sites which allows modification of a representation of the reservoir, referred to as "reservoir model", in order to make the reservoir model coherent with the various data collected in the field.

2. Description of the Prior Art

Optimization and development of petroleum reservoirs are based on the most accurate possible description of the structure, the petrophysical properties, the fluid properties, etc., of the reservoir being studied. A software tool accounting for these aspects in an approximate way is a "reservoir model." A reservoir model is a model of the subsoil, representative of both its structure and its behavior. Generally, this type of model which is represented in a computer is referred to as a "numerical model." A reservoir model comprises generally a three-dimensional grid, associated with one or more petrophysical property maps (porosity, permeability, saturation, etc.). The association assigns values of these petrophysical properties to each cell of the grid.

These models which are well known and widely used in the petroleum industry, allow determination of many technical parameters relative to the study or the development of a reservoir, such as a hydrocarbon reservoir. In fact, since the reservoir model is representative of the structure of the reservoir and of the behavior thereof, engineers use it, for example, in order to determine which zones are the most likely to contain hydrocarbons, the zones in which it may be interesting/necessary to drill an injection or a production well in order to enhance hydrocarbon recovery, the type of tools to use, and the properties of the fluids to be used and recovered, etc. These interpretations of reservoir models in terms of "technical development parameters" are well known. Similarly, modelling $CO_2$ storage sites allows monitoring these sites, to detect abnormal behaviors and to predict the displacement of the injected $CO_2$.

The purpose of a reservoir model thus is to best account for all the available information on a reservoir. A reservoir model is representative when a reservoir simulation for this model provides historical data estimations that are very close to the observed data. What is referred to as historical data are the production data obtained from measurements in wells in response to the reservoir production (oil production, water production of one or more wells, gas/oil ratio (GOR), production water proportion (water cut)), and/or repetitive seismic data (4D seismic impedances in one or more regions, etc.). A reservoir simulation is a technique allowing simulation of fluid flows within a reservoir by means of software referred to as "flow simulator" and of the reservoir model.

Integration of all the available data is therefore essential. These data generally comprise:

- measurements at certain points of the geological formation, in wells for example. These data are referred to as "static" because they are invariable in time (on the scale of the reservoir production times),
- "historical data", comprising production data, for example the fluid flow rates measured in wells, tracer concentrations and data obtained from repetitive seismic acquisition campaigns at successive times. These data are referred to as dynamic because they evolve during the development and they are indirectly linked with the properties assigned to the cells of the reservoir model.

Techniques for integration of dynamic data (production and/or 4D seismic) in a reservoir model are known which are referred to as "history matching" techniques.

History matching modifies the parameters of a reservoir model, such as permeabilities, porosities or well skins (representing damages around the well), fault connections, etc., in order to minimize the differences between the simulated and measured historical data. The parameters can be linked with geographic regions, such as permeabilities or porosities around one or more wells. The difference between real data and simulated data forms a functional referred to as objective function. The history matching problem is solved by minimizing this functional.

The optimization loop is as follows. The petrophysical properties (lithofacies, porosities, permeabilities, etc.) are generated in a first grid and all of these data make up the geological model of the reservoir. Since the geological grid can be relatively fine, these properties are upscaled to a coarser grid, referred to as flow grid, in order to reduce the computation times during simulation. The production record is then simulated in this grid. This simulation allows computing well production data, as well as water, oil and gas saturation and pressure maps at different times. When 4D seismic data are available, these maps are transmitted to a petro-elastic model that computes the seismic attributes of the model. These seismic attributes and simulated production data are then compared with the data measured via the objective function.

The grid used by the petro-elastic model can have a finer resolution than the flow grid, or it can be identical to that of the geological model. A stage of downscaling the pressure and saturation maps of the flow grid to the seismic grid is then necessary. If the flow grid was constructed by agglomerating the cells of the petro-elastic model, a simple way of carrying out this downscaling assigns the pressures and the saturations of a cell of the flow grid to the underlying fine cells. This method is however not accurate in practice because it does not account for the underlying heterogeneities within a coarse cell. Now, the spatial variations of the pressure and the distribution of the saturations greatly depend on the absolute and relative permeabilities and porosities present on the fine scale. If these heterogeneities are not taken into account, computation of the seismic attributes becomes less accurate because the impedances are themselves sensitive to the pressure and saturation variations. Downscaling the pressures and the saturations thus aims to compute seismic attributes that are more representative of the geological model and to reduce the error introduced through upscaling.

There are known techniques allowing this pressure and saturation downscaling to be performed. A state of the art and a new technique are presented in the following document:

S. A. Castro, *A Probabilistic Approach to Jointly Integrate 3D/4D Seismic, Production Data and Geological Information for Building Reservoir Models*, PhD thesis, Stanford University, 2007.

This document presents two techniques using only static data (absolute permeabilities, porosities, percentage of shale, etc.) for improving saturation downscaling and it also provides a solution based on local flow simulations. In the paragraphs below, each of these techniques is briefly presented.

A first solution recalculates a saturation distribution in each coarse cell using the porosities present on the fine scale, that is:

$$S(u)=S(v)\phi(u)/\overline{\phi(v)} \forall u \subset v$$

In the above equation, u designates a fine cell included in a coarse cell v, S one of the three saturations, $\phi$ the porosity and $\overline{\phi(v)}$ the arithmetic mean of the porosity in cell v.

In:
M. Sengupta, *Integrating Rock Physics and Flow Simulation to Reduce Uncertainties in Seismic Reservoir Monitoring*, PhD thesis, Stanford University, 2000,
1D downscaling of the saturations is carried out along the wells using data provided by the logs (porosities, permeabilities, percentage of shale, etc.). This downscaling then allows calculation of more accurate amplitude variations in the wells.

The two aforementioned algorithms are purely statistical and they do not use data such as pressures and saturations in the initial state, relative permeabilities, etc. Castro proposed another saturation downscaling algorithm based on local flow simulations. Reconstruction is achieved by iterating in the coarse cells while following the direction of flow and using the saturations calculated upstream as the boundary conditions.

SUMMARY OF THE INVENTION

The invention is an alternative method for optimizing the development of an underground medium, from a geological model. The method comprises history matching of this model to dynamic data, using, for seismic data matching, a reconstruction in the fine grid of the pressure and saturation fields. A pressure equation is locally solved in the fine grid, and the saturations are calculated, at the level of each coarse cell, by writing the continuity of the phase flows between neighboring lithofacies, the conservation of the pore volume and the conservation of the phase volume.

The invention relates to a method for optimizing the development of an underground medium, from a flow model (ME) having a first grid forming a set of cells discretizing the medium, wherein production data (DP) and seismic data (DS) associated with a second grid are acquired during the development of the medium. Each cell of the first grid contains a set of cells of the second grid. The method comprises the following stages:
  simulating production data, as well as pressure and saturation values in each cell of the first grid, using a flow simulator;
  assigning a pressure value to each cell of the second grid;
  assigning a saturation value to each cell of the second grid while carrying out the following stages for each cell of the first grid:
    identifying zones (Rn) with a set of connected cells of the second grid having an identical lithofacies value;
    determining, for each identified zone, a saturation value by solving a system made up of a first system of equations (S1) expressing a continuity of fluid flows between neighboring identified zones, and a second system of equations (S2) expressing a conservation of a pore volume in each identified zone and a conservation of a volume of each fluid in the cell of the first grid;
simulating seismic data in the second grid by pressure and saturation values associated with each cell of the second grid;
modifying the flow model so as to minimize a difference between the measured production data and the simulated production data, and to minimize a difference between the measured seismic data and the simulated seismic data.

According to the invention, the flow model can be modified by modifying petrophysical property values associated with each cell of the second grid. The model is used with the modified values to define an optimum development scheme for the underground medium and the underground medium can then be developed according to this development scheme.

According to the invention, the first system of equations can involve only relative permeabilities of the fluids in each identified zone (Rn). It can be obtained by writing the following equation for each connected zone n:

$$\frac{kr_{\alpha 1,Rn}(S_{\alpha 1,Rn})}{kr_{\alpha 1,Rn}(S_{\alpha 1,Rn}) + kr_{\alpha 2,Rn}(S_{\alpha 2,Rn})} = \frac{kr_{\alpha 1,Rn+1}(S_{\alpha 1,Rn+1})}{kr_{\alpha 1,Rn+1}(S_{\alpha 1,Rn+1}) + kr_{\alpha 2,Rn+1}(S_{\alpha 2,Rn+1})}$$

with:
  $kr_{\alpha,Rn}$ relative permeability of fluid phase a
  $S_{\alpha,Rn}$ saturation of fluid phase $\alpha$ in an identified zone $R_n$
  The second system of equations can be written as follows:

$$\begin{cases} \left(S_{\alpha 1,R1} \sum_{i \subset l, i \subset R1} Vol_i \cdot \phi_{f,i}\right) + \ldots + \left(S_{\alpha 1,Rn} \sum_{i \subset l, i \subset Rn} Vol_i \cdot \phi_{f,i}\right) = S_{\alpha 1,l} \cdot Vol_l \cdot \phi_{c,l} \\ \ldots \\ \left(S_{\alpha p,R1} \sum_{i \subset l, i \subset R1} Vol_i \cdot \phi_{f,i}\right) + \ldots + \left(S_{\alpha p,Rn} \sum_{i \subset l, i \subset Rn} Vol_i \cdot \phi_{f,i}\right) = S_{\alpha p,l} \cdot Vol_l \cdot \phi_{c,l} \\ \sum_p S_{\alpha p,R1} = 1 \\ \ldots \\ \sum_p S_{\alpha p,Rn} = 1 \end{cases}$$

with:
  $\alpha 1, \ldots \alpha p$ are fluids 1 to p
  $R1, \ldots Rn$ are identified zones 1 to n
  i is a cell of the second grid included in a cell l of the first grid
  $Vol_i$ is the volume of a cell i of the second grid
  $Vol_l$ are volume of a cell l of the first grid
  $\phi_{f,i}$ is the porosity of a cell i of the second grid
  $\phi_{c,l}$ is a porosity of a cell l of the first grid
  $S_{\alpha,R}$ is the saturation of fluid phase $\alpha$ in an identified zone R
  $S_{\alpha,l}$ is the saturation of fluid phase $\alpha$ in cell l, calculated by the flow simulation.
In order to assign a pressure value to each cell of the second grid, the following stages can be carried out:
  partitioning the first grid into a set of connected subdomains;
  solving, for each subdomain, an equation of conservation of the total volume of the fluids in the cells of the second grid included in the subdomain.
In this case, the following conservation equation can be used:

$$\text{div}(K_f(\eta_w + \eta_o + \eta_g)_{f,c} \nabla P) = 0 \text{ in } \Omega_{loc}$$

$$P = P_{B_{loc}} \text{ in } B_{loc}$$

with:
  $k_f$ being the permeability defined in the second grid
  $\eta_{\alpha,f,c}$ being the mobility of a fluid phase $\alpha$ calculated from the relative permeability associated with the lithofacies present on the fine grid subscript f) and the saturations of the coarse grid (subscript c); and $P_{B_{loc}}$ being the pressure on a boundary $B_{loc}$ of subdomain $\Omega_{loc}$, obtained by interpolating the pressures calculated by the flow simulation.

According to an embodiment, if the porosity of a cell of the second grid is lower than a first fixed threshold, no pressure value is assigned to this cell and flows with neighboring cells are considered to be zero; and if the permeability of a cell of the second grid is lower than a second fixed threshold, this cell is assigned a pressure value equal to a pressure before the development of the medium, and flows with neighboring cells are considered to be zero.

Finally, according to an embodiment, if the porosity of an identified zone is lower than a first fixed threshold, no saturation value is assigned to this zone; and if the permeability of an identified zone is lower than a second fixed threshold, this zone is assigned a saturation value equal to a saturation before the development of the medium.

BRIEF DESCRIPTION OF THE DRAWINGS

Other features and advantages of the method according to the invention will be clear from reading the description hereafter of embodiments given by way of non limitative examples, with reference to the accompanying figures wherein.

DETAILED DESCRIPTION OF THE INVENTION

In the present description, "upscaling" is applied to the properties associated with a first grid in order to adjust them to a second grid whose resolution is lower than that of the first grid (scale change from a fine scale to a coarse scale). Conversely, "downscaling" is applied to the properties associated with a first grid in order to adjust them to a second grid whose resolution is higher than that of the first grid (scale change from a coarse grid to a fine grid).

Figure 1:
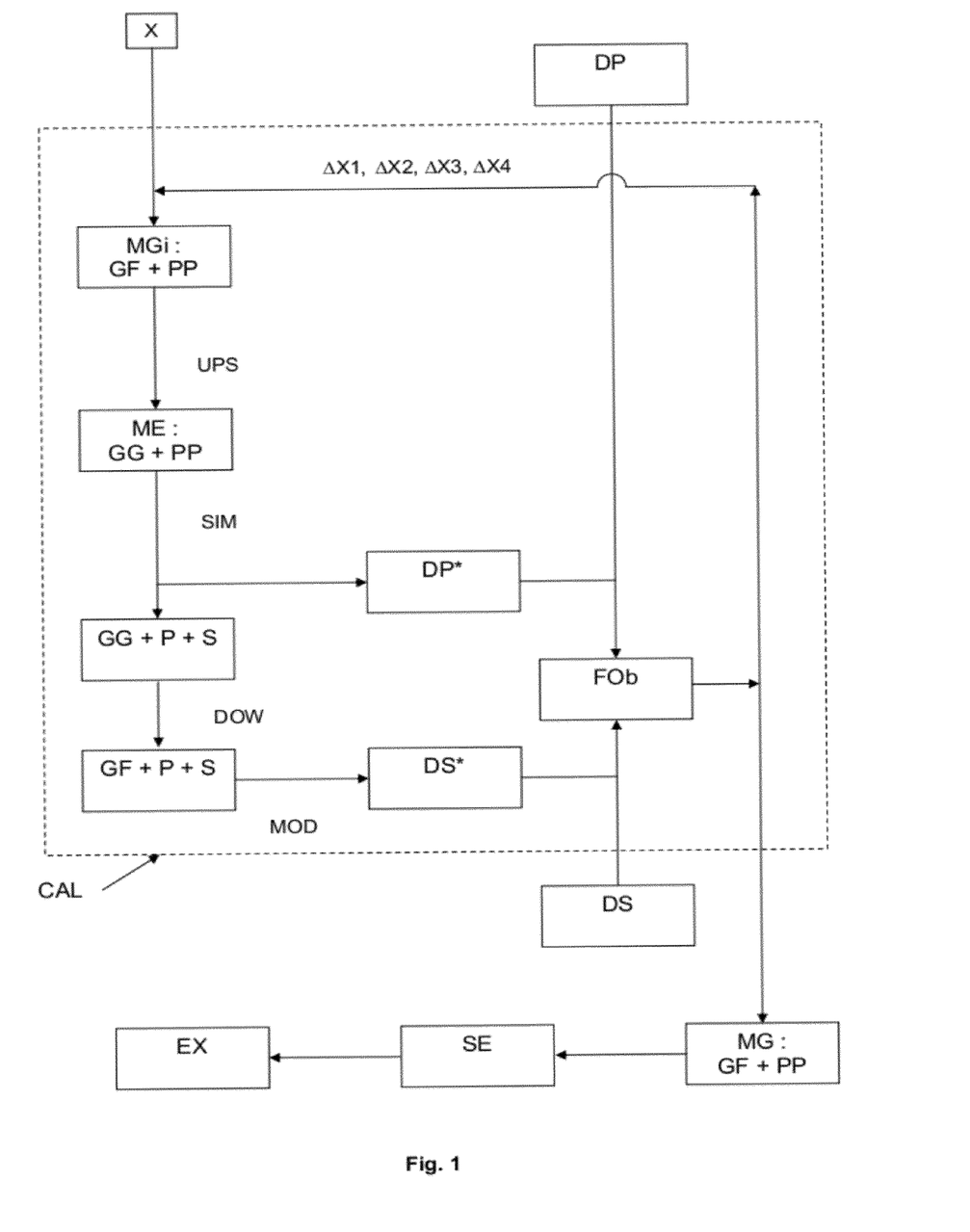
FIG. 1 illustrates the method of developing a petroleum reservoir according to the invention.

FIG. 1 illustrates the method of developing a petroleum reservoir according to the invention. The method essentially comprises four stages:
1. generating a first initial geological model (MGi) from a set of parameters (X1);
2. acquiring dynamic data (DP, DS) during the reservoir development and defining an objective function (FOb) for history matching;
3. performing history matching (CAL) by carrying out the following stages:
   i. upscaling (UPS) the petrophysical properties (PP) of the geological model on a coarser grid (GG) with the model obtained being referred to as flow model (ME) and a set of parameters associated with the upscaling stage being denoted by (X2);
   ii. carrying out a flow simulation (SIM) on the model with a set of parameters associated with the flow simulation being denoted by (X3);
   iii. downscaling (DOW), the pressure (P) and saturation (S) maps on a date when seismic records are available;
   iv. calculating (MOD) and the seismic data (DS*) corresponding to these dates using the maps obtained in the previous stage and a petro-elastic model (PEM) with a set of parameters associated with the petro-elastic model being denoted by (X4); and
   v. the simulated seismic data (DS*) and production data (DP*) being compared with the measurements (DS, DP) by the objective function with an optimization algorithm modifying the sets of parameters (X1), (X2), (X3), (X4) until the objective function reaches a minimum.
4. developing (EX) the reservoir according to a development scheme (SE) suited to the reservoir model (MR) obtained at the end of the history matching stage.

The calibration parameters from sets (X1), (X2), (X3), (X4) are in practice selected after a sensitivity analysis. Since it is not always possible to calibrate all the uncertain parameters of the model at the same time, only the parameters having the highest influence on the objective function are kept upon optimization. In the rest of the description hereafter, some examples are given of inversion parameters that can be selected in each set:

X1 is the proportion of lithofacies, local or global gradual deformation parameters, etc.

X2 if a power law is used to average the permeability field, is the exponent of the law which can be adjusted by calibration;

X3 is the well skin factor with residual water saturations being used in the relative permeability or capillary pressure curves, transmissivity multipliers at the level of the faults, etc., X4: is a Hertz exponent of bulk moduli of various types of rocks, etc.

1—Generating an Initial Geological Model (MGi)

Geological formations are generally very heterogeneous media. Modelling an underground reservoir, that is constructing a representation of the reservoir which is referred to as geological model, requires construction methods referred to as "probabilistic" due to the reduced volume of available information (limited number of wells, etc.). Construction of a geological model first depends on the environment of the geological deposit, which allows representation of the major heterogeneities controlling the fluid flow. Integration of the static data in this model requires linear operations and it can be done from known geostatistical techniques.

A geological model represented in a computer includes a grid with N dimensions (N>0 and generally two or three) with each cell being assigned a value of properties characteristic of the zone being studied. These properties are referred to as petrophysical properties (PP). It can be, for example, the lithology, the porosity and the permeability. These values make up maps. Thus, a model is a grid associated with at least one map. The grid of a geological model is referred to as "fine" because it comprises a large number of cells, so as to best represent the heterogeneities of the medium. Conversely, a flow model is a grid referred to as "coarse", which is a grid comprising larger cells, less numerous than those of the geological model.

A fine grid of a geological model is denoted by GF and a coarse grid of a flow model is referred to as GG.

Generation of the geological model is done with geostatistical modelling tools such as those described in the following documents:

L.-y. Hu. Gradual Deformation and Iterative Calibration of Gaussian-Related Stochastic Models. Mathematical Geology Vol. 32, pp. 87-108, 2000, M. Le Ravalec-Dupin, B. Noetinger. Optimization with the Gradual Deformation Method. Mathematical Geology Vol. 34, No. 2, pp. 125-142, 1-2-2002, Matheron G., Beucher H., de Fouquet C., Galli A., Guerillot D., et Ravenne C. 1987: Conditional Simulation of the Geometry of Fluvio Deltaic Reservoirs. SPE 62nd Annual Conference, Dallas, Tex., pp. 591-599.

According to an embodiment example, a geostatistical model based on a random Gaussian field is used to generate the porosity ($\phi$) and density ($\rho$) fields.

According to another embodiment, it can be advantageous to first populate the geological model with lithofacies, of the rock type. In fact, this description of the reservoir in lithofacies allows working per lithofacies, that is it is possible to define probability laws with different simulation types per lithofacies to make the model more accurate. The grid of the geological model can therefore be populated with lithofacies for example, using the thresholded Gaussian method. This method affords the advantage of being compatible with the gradual deformation technique, which makes the model more efficient. Any other method allowing using the gradual deformations for solution of the inverse problem can also be advantageously used. The population can be constrained by one or more seismic attributes, directly (simulation techniques with external drift or co-simulation techniques) or indirectly (proportion curves derived from seismic attributes).

It is then possible to either assign a constant value per lithofacies for each reservoir property, or to draw lots in distributions defined per lithofacies, or to carry out co-simulations of variables ($\phi$, $\rho$) per lithofacies. It is also possible to simulate the volume of shale $V_{SH}$, either by assigning a constant volume per lithofacies or by drawing lots in distributions defined per lithofacies, according to the petro-elastic model being used.

According to a particular embodiment being used, the contacts within the reservoir between the oil and the water (OWC) and between the gas and the water (GWC) are furthermore determined. This information allows refining the values and/or the distributions by making them depend on the position of the cell with respect to the contacts. The saturation depends on the position above the contact. If the transition zone is clear-cut, switches from Sw=100% to Sw=Swi rapidly occurring. On the other hand, there can also be more progressive transition zones.

In any case, the reservoir properties can be associated with the grid of the geological model by generating random numbers and then by applying a simulation method. Thus, a set of random numbers allows simulation of lithofacies values in any cell of the model, and another set of random numbers allows simulation of reservoir property values in any cell of the model.

By modifying the parameters used during the simulations and the optimization (gradual deformation for example), new random numbers can be generated to update the geological model.

Thus, at the end of this stage, a fine geological model described in reservoir properties (porosity $\phi$, density $\rho$, volume of shale $V_{SH}$, etc.) is obtained. The model can also be described in lithofacies.

2—Dynamic Data (DD) Acquisition and Definition of an Objective Function

At this stage, the dynamic data have not been considered for constructing the geological model (MG). Dynamic data (DD) are thus acquired during the reservoir development. These data have the specific feature of varying over time as a function of the fluid flows in the reservoir. The data generally are 4D seismic data (DS) and production data (DP), such as well test data or breakthrough time data. This stage is carried out by means of measuring tools such as flow meters or of seismic campaigns. The seismic data (DS) are represented in a grid where each cell comprises at least one value of a seismic attribute.

These dynamic data are then integrated in the geological model through an optimization referred to as history matching.

3—History Matching (CAL)

In order to achieve matching and thus to integrate the dynamic data (DD) into the geological model, an objective function measuring the difference between the dynamic data measured in the field and the corresponding responses simulated for the model being considered is defined. The purpose of the optimization procedure is to gradually modify this model to reduce the objective function.

This stage is carried out by a computer using a technical software referred to as flow simulator, for simulating the dynamic data from the representation of the reservoir, and by means of another tool allowing simulation of seismic data from the representation of the reservoir.

Upscaling (UPS)

Due to the large number of cells contained in the geological model and to the repetition of the flow simulations during a matching procedure, the cumulative computation time required by the simulator can be very long. To reduce it, reservoir engineers carry out upscaling of the petrophysical properties (absolute and relative permeabilities, porosities) of the geological model on a grid having a coarser resolution. The model resulting from this upscaling stage is referred to as flow model (ME). Thus, a flow model, represented in a computer, has an N-dimensional (N>0 and generally equal to two or three) coarse grid (GG) with each cell being assigned the value of a characteristic property of the zone being studied. It can be, for example, that the porosity or the permeability distributed in a reservoir (PP). These values make up maps. Thus, a model is a grid associated with at least one map.

Locally, for the pore volume in each cell of the grid used by the simulator to be identical to the volume given by the geological model, the arithmetic mean of the porosities included in these cells is calculated.

On the other hand, except for very particular cases, there is no general formula for upscaling the absolute and relative permeabilities. Various algorithms have been proposed in the literature. The references below present the more commonly used algorithms:

For absolute permeabilities upscaling:
    L. J. Durlofsky, *Upscaling of Geocellular Models for Reservoir Flow Simulation: A Review of Recent Progress*, Paper presented at 7*th* International Forum on Reservoir Simulation, Bühl/Baden-Baden, Germany, Jun. 23-27, 2003,
    Ph. Renard, G. de Marsily, *Calculating Equivalent permeability: A Review*, Advances in Water Resources, Vol. 20, Nos. 5-6, pp. 253-278, 1997.

For relative permeabilities upscaling:
    J. W. Barker, S. Thibeau, *A Critical Review of the Use of Pseudorelative Permeabilities for Upscaling*, Paper (SPE 35491) first presented at the 1996 European 3D Reservoir Modelling Conference, Stavanger, 1997.

Flow Simulation (SIM)

Flow simulation is carried out by a software referred to as a flow simulator. This tool is well known.

Such a simulation allows calculation of well production data (DP*), as well as pressure (P) and saturation (S) maps on the dates when seismic records (DS) were achieved. These maps are associated with a coarse grid since they result from the flow model, itself being a coarse grid (GG).

According to the invention, these pressures and saturations are then used by a petro-elastic model (PEM) to simulate seismic data (DS*), which is referred to as synthetic, on the same dates. This allows comparison of the model with the acquired seismic data.

Downscaling (DOW)

However, the resolution of the seismic data is generally finer than that of the flow grid. A second scaling procedure, referred to as downscaling, is therefore necessary.

It calculates pressure (P) and saturation (S) maps with the same resolution as the seismic data grid, from the pressure (P) and saturation (S) maps obtained from the flow simulator.

To simplify the description, the grids of the seismic data and of the geological model are assumed to be identical, which is in practice often verified since part of the information resulting from the seismic surveys is used to construct the initial geological model. The grid of the flow model is also assumed to be constructed by agglomerating the cells of the geological model. In this invention, downscaling is performed by two different algorithms for the pressures and the saturations.

Calculation of the pressures on the fine grid is carried out using the algorithm described in:
    Y. Gautier, M. J. Blunt, M. A. Christie, Nested Gridding and Streamline-Based Simulation Reservoir Performance Prediction, Computational Geosciences, 3, 295-320, 1999.

Figure 2:
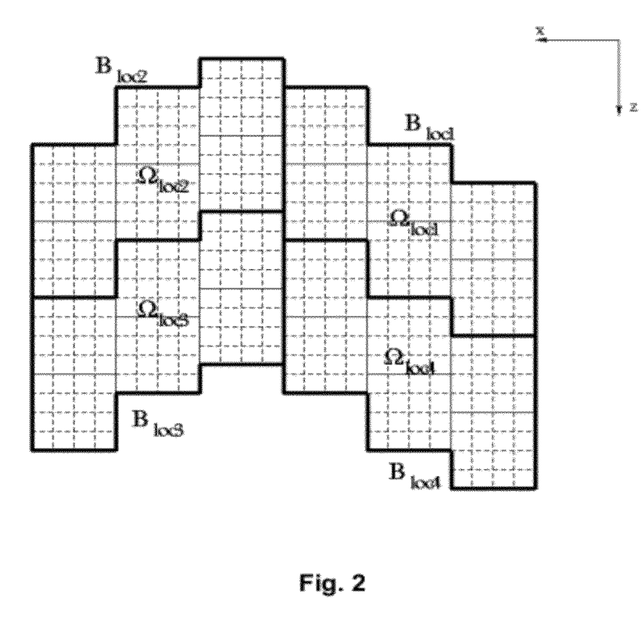
FIG. 2 shows, in a 2D vertical cross-section, an example of partition of the geological grid into subdomains prior to the downscaling of pressure maps.

This algorithm works as follows. The flow grid is partitioned into a set of connected subdomains having coarse cells (see FIG. 2). FIG. 2 shows, in a 2D vertical cross-section, an example of partition of the geological grid into subdomains before downscaling the pressures of the coarse grid to the fine grid. The cells of the fine grid are shown in dotted lines with those of the flow grid being full lines. The limits of the subdomains are shown in thick lines. In each subdomain, an equation of conservation of the total volume of fluid is solved on the underlying fine grid:

$$\text{div}(K_f(\eta_w+\eta_o+\eta_g)_{f,c}\nabla P)=0 \text{ in } \Omega_{loc}$$

$$P=P_{B_{loc}} \text{ in } B_{loc}$$

In the above equation:
$K_f$ designates the permeability defined on the fine grid;
$\eta_{\alpha,f,c}$ is the mobility of a phase $\alpha$ calculated from the relative permeability associated with the lithofacies present on the fine grid (subscript f) and the saturations of the coarse grid (subscript c); and
$P_{B_{loc}}$ the pressure on boundary $B_{loc}$ of the subdomain, obtained by interpolating the pressures calculated by the flow simulation.

To obtain this equation, a low density and viscosity variation as a function of the pressure within a subdomain $\Omega_{loc}$ is assumed.

If the subdomain contains perforations linked with the presence of wells, the total flow rates or the bottomhole pressures provided by the simulator are used to calculate the flows between the perforations and the reservoir.

What is referred to as a dead cell is a cell having a porosity and/or a permeability that is (are) lower than a certain threshold set by the reservoir engineer. If the porosity of a fine cell is too low, it is assumed that no fluid is present. The pressures and the saturations are not defined and no calculation is carried out for this cell. The flows with its neighboring cells are considered to be zero. If only the permeability is low in a cell, this cell keeps the initial pressures and saturations, that is as before development of the reservoir. The flows with its neighboring cells are also zero. The maps giving the initial pressures and saturations can be obtained by calculating the initial state with the simulator, directly on the grid of the geological model. Since this calculation requires no time iteration, this stage does not consume much computation time.

The saturation downscaling algorithm is described hereafter.

Figure 3:
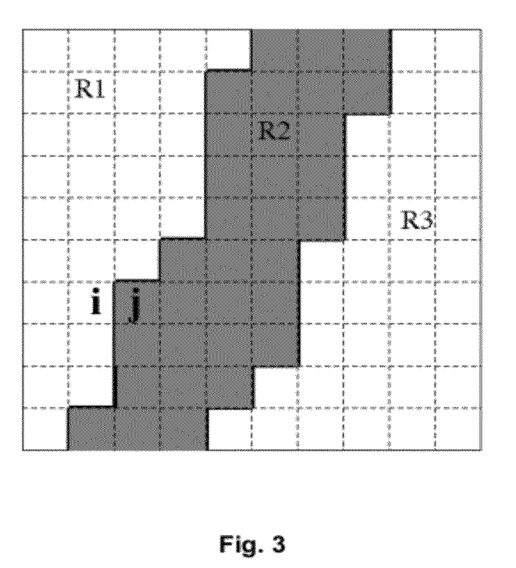
FIG. 3 shows a cell of the flow grid with the underlying fine grid being a dotted line and the lithofacies associated with each fine cell (in this example, two lithofacies are present and represented by white or grey cells)

Calculation of the saturations on the fine grid is carried out here by iterating in each cell of the flow grid. In each cell, the oil and gas saturations are assumed to be constant in connected zones of equal lithofacies. A connected zone is denoted by R, and the NbZ connected zones identified are denoted by $R_n$, n=1 to NbZ. FIG. 3 shows for example a coarse cell and the underlying fine grid in dotted line. This cell contains two lithofacies (white and grey zones). Here, zone $R_1$ has the same lithofacies as $R_3$, but it is not in contact therewith due to the presence of zone $R_2$. In this case, the algorithm calculates three different saturation triplets for these three zones. Identification of the connected zones of equal lithofacies ($R_n$), in dimensions N=2,3, is done using the two-pass algorithm described in:
    L. Shapiro and G. Stockman, Computer Vision, pp. 69-73, Prentice Hall, 2002.

Once zones $R_n$ are identified, the continuity of the flows of the phases between neighboring zones is written. For example, the two cells i and j as shown in FIG. 3 are considered wherein:

$$\forall \alpha \in \{w,o,g\}, K_i kr_{\alpha,i,R_1}(P_i-P_{ij})=K_j kr_{\alpha,j,R_2}(P_{ij}-P_j)$$

with $kr_\alpha$ designating here the relative permeability of phase $\alpha$ (w (water), o (oil) or g (gas)). In this relation, the density and the viscosity are again assumed to be constant, and the influence of gravity and of the capillary pressures are considered to be negligible. From these three equations (one for each phase), it is possible to eliminate pressures P and permeabilities K. The algebraic manipulations are described in the following document:
    X-H. Wang, M. Quintard, G. Darche, Adaptive Mesh Refinement for One-dimensional Three-phase Flow with Phase Change in Porous Media, Numerical Heat Transfer, Part B, 50, 231-268, 2006.

A first system (S1) of equations is obtained where only the relative permeabilities of oil and of gas in each zone ($R_n$) are involved (in an equivalent manner, the same system can be re-written according to the water-oil or water-gas pairs). In the case considered in FIG. 3, the following relationship exists:

$$\begin{cases} \dfrac{kr_{o,R_1}(S_{o,R_1})}{kr_{o,R_1}(S_{o,R_1})+kr_{g,R_1}(S_{g,R_1})} = \dfrac{kr_{o,R_2}(S_{o,R_2})}{kr_{o,R_2}(S_{o,R_2})+kr_{g,R_2}(S_{g,R_2})} \\ \dfrac{kr_{g,R_3}(S_{g,R_3})}{kr_{o,R_3}(S_{o,R_3})+kr_{g,R_3}(S_{g,R_3})} = \dfrac{kr_{g,R_2}(S_{g,R_2})}{kr_{o,R_2}(S_{o,R_2})+kr_{g,R_2}(S_{g,R_2})} \end{cases}$$

And generally, with two phases α1 and α2, and for each connected zone n:

$$\dfrac{kr_{\alpha 1,Rn}(S_{\alpha 1,Rn})}{kr_{\alpha 1,Rn}(S_{\alpha 1,Rn})+kr_{\alpha 2,Rn}(S_{\alpha 2,Rn})} = \dfrac{kr_{\alpha 1,Rn+1}(S_{\alpha 1,Rn+1})}{kr_{\alpha 1,Rn+1}(S_{\alpha 1,Rn+1})+kr_{\alpha 2,Rn+1}(S_{\alpha 2,Rn+1})}$$

The relative permeability curves used here can be different from one zone to the next, if specific curves have been defined for each lithofacies. These curves per connected zone are denoted by: $kr_{\alpha,Rn}$. This first system of equations (S1) is not sufficient for calculating the saturations of the phases in these zones. To close the system, the conservation of the pore volume in each zone ($R_n$) and the conservation of the volume of each phase in the coarse cell using the values calculated in the flow simulation is written. This second system of equations is denoted by (S2).

In general terms, this second system of equations (S2) is written as follows:

$$\begin{cases} \left(S_{\alpha 1,R1}\sum_{i\subset l,i\subset R1} Vol_i\cdot\phi_{f,i}\right)+\ldots+\left(S_{\alpha 1,Rn}\sum_{i\subset l,i\subset Rn} Vol_i\cdot\phi_{f,i}\right)=S_{\alpha 1,l}\cdot Vol_l\cdot\phi_{c,l} \\ \ldots \\ \left(S_{\alpha p,R1}\sum_{i\subset l,i\subset R1} Vol_i\cdot\phi_{f,i}\right)+\ldots+\left(S_{\alpha p,Rn}\sum_{i\subset l,i\subset Rn} Vol_i\cdot\phi_{f,i}\right)=S_{\alpha p,l}\cdot Vol_l\cdot\phi_{c,l} \\ \sum_p S_{\alpha p,R1}=1 \\ \ldots \\ \sum_p S_{\alpha p,Rn}=1 \end{cases}$$

with:
α1, ... αp being fluids 1 to p
R1, ... Rn being connected zones 1 to n
i being a cell of the second grid included in a cell l of the first grid
$Vol_i$ being a volume of a cell i of the second grid
$Vol_l$ being a volume of a cell l of the first grid
$\phi_{f,i}$ being the porosity of a cell i of the second grid
$\phi_{c,l}$ being the porosity of a cell l of the first grid
$S_{\alpha,R}$ being the saturation of phase α in a connected zone R
$S_{\alpha,l}$ being the saturation of phase α in cell l, calculated by the flow simulation.

Thus, in the example of FIG. 3, (S2) is written as follows:

$$\begin{cases} S_{o,R_1}\sum_{i\subset l,i\subset R_1} Vol_i\phi_{f,i}+S_{o,R_2}\sum_{i\subset l,i\subset R_2} Vol_i\phi_{f,i}+ \\ S_{o,R_3}\sum_{i\subset l,i\subset R_3} Vol_i\phi_{f,i}=Vol_l\phi_{f,i}=Vol_l\phi_{c,l}S_{o,l} \\ S_{g,R_1}\sum_{i\subset l,i\subset R_1} Vol_i\phi_{f,i}+S_{g,R_2}\sum_{i\subset l,i\subset R_2} Vol_i\phi_{f,i}+ \\ S_{g,R_3}\sum_{i\subset l,i\subset R_3} Vol_i\phi_{f,i}=Vol_l\phi_{c,l}S_{g,l} \\ S_{w,R_1}=1-S_{o,R_1}-S_{g,R_1} \\ S_{w,R_2}=1-S_{o,R_2}-S_{g,R_2} \\ S_{w,R_3}=1-S_{o,R_3}-S_{g,R_3} \end{cases}$$

with:
i being a fine cell included in a cell l,
Vol being the volume of these cells,
$\phi_{f,i}$ being the porosity of a fine cell i,
$S_{\alpha,Ri}$ being the saturation of phase in a zone $R_n$,
$S_{\alpha,i}$ being the saturation calculated by the flow simulation.
The system of equations (S1) and (S2) is eventually solved.
Treatment of dead cells, previously described for the pressures, is applied here in zones ($R_n$). No calculation is carried out for the non-porous zones. The impermeable porous zones keep their initial values and these values are used in equations (S2) relative to the conservation of the volumes of the phases and of the pore volumes.

Seismic Modelling (MOD)

One of the objectives of the method according to the invention is to make the constructed coherent with the seismic data. therefore an inverse problem that simulates seismic data (DS*) from the geological model, via the pressures and saturations thus evaluated on a fine grid is solved.

In order to provide the grid of the geological model with seismic data (amplitudes, impedances), and a petro-elastic model (PEM) corresponding to the geological model are constructed. An example of a petro-elastic model is given in:

S. A. Castro, A Probabilistic Approach To Jointly Integrate 3D/4D Seismic, Production Data and Geological Information for Building Reservoir Models, PhD thesis, Stanford University, 2007.

As is known, the pressure and saturation maps allow evaluation of the densities and the bulk moduli of the fluids. The velocities of the compressional (P wave) and of the shear (S wave) waves are then calculated from the densities and the bulk moduli.

Thus, at the end of this stage, a geological model exists and describe in terms of simulated seismic data (seismic impedances, amplitudes).

The simulated seismic data then has to be compared with the observed seismic data.

Optimization

In order to achieve calibration, and thus to integrate the dynamic data (DD) into the geological model, an objective function (Fob) measuring the difference between the dynamic data measured in the field and the corresponding responses simulated for the model being considered is defined. The purpose of the optimization procedure is to gradually modify this model to reduce the objective function.

The objective function conventionally comprises a term measuring the difference between the simulated and the observed production data (DP*-DP) and a term measuring the difference between the simulated and the observed seismic data (DS*-DS). A function of the type as follows can for example be used:

$$FOb = pp\Sigma(DP-DP^*)^2 + ps\Sigma(DS-DS^*)^2$$

where pp is a weight associated with the production data and ps is a weight associated with the seismic data.

In order to reduce the value of this objective function (Fob), at least one of the sets of parameters X1, X2, X3 and X4 is modified. These variations are denoted by ΔX1, ΔX2, ΔX3, ΔX4.

Thus, at the end of this stage, a geological model exists described in petrophysical properties (porosity, permeability, etc.) meeting the dynamic data (DP and DS).

4—Reservoir Development According to a Suitable Development Scheme (EX-SE)

From this geological model, calibrated with the dynamic data, a development scheme is defined (location of producer wells, injector wells, etc.). In fact, from this geological model, and by means of known tools (flow simulation softwares for example), the operating mode of the underground zone being studied is defined. For example, simulation of the flows in a porous medium represented by this geological model allows, among other things, prediction of the reservoir production and thus optimizing its development by testing various scenarios.

By defining various production scenarios, then by testing each scenario by means of a flow simulator and of the geological model, the optimum scenario is determined by comparing for example the volume of oil recovered, the optimum scenario being, in this case, the one likely to afford the maximum recovery level.

The reservoir is then developed according to this development scheme.

APPLICATION EXAMPLE

Figure 4:
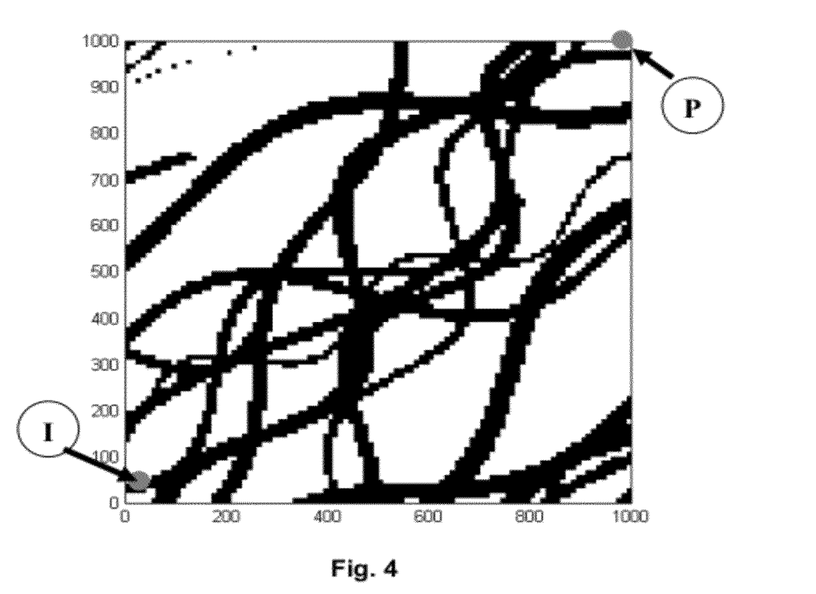
FIG. 4 shows the lithofacies map of the application example, as well as the position of the injection (I) and production (P) wells.
Figure 5:
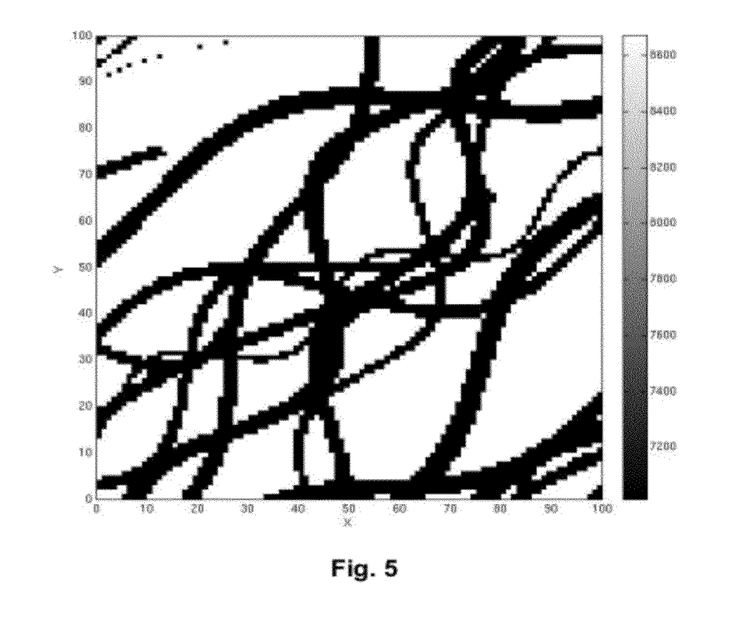
FIG. 5 gives the value of the P type initial impedances (in $g \cdot cm^{-3} \cdot m \cdot s^{-1}$) (compressional waves) calculated by simulating the flow directly on the fine grid.
Figure 6:
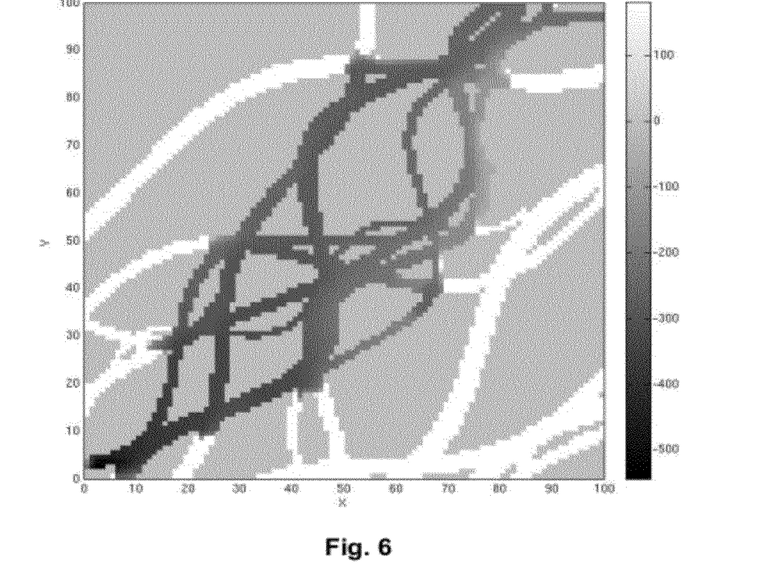
FIG. 6 gives the 3000-day P type impedance differences (in $g \cdot cm^{-3} \cdot m \cdot s^{-1}$) in relation to the initial values with the values being calculated by simulating the flow directly on the fine grid.
Figure 7:
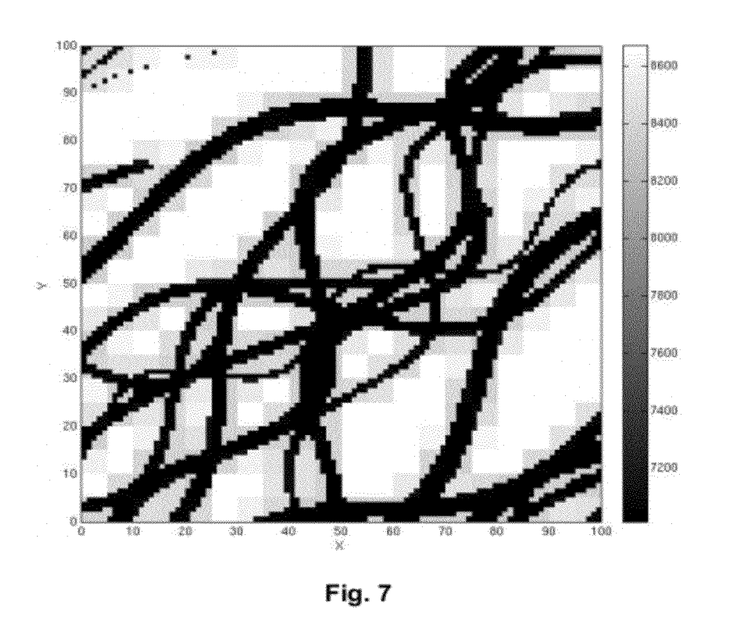
FIG. 7 shows the initial impedances (in $g \cdot cm^{-3} \cdot m \cdot s^{-1}$) obtained by upscaling the petrophysical properties and by downscaling the pressure and saturation maps, where the values of a coarse cell are simply assigned to the underlying fine cells'
Figure 8:
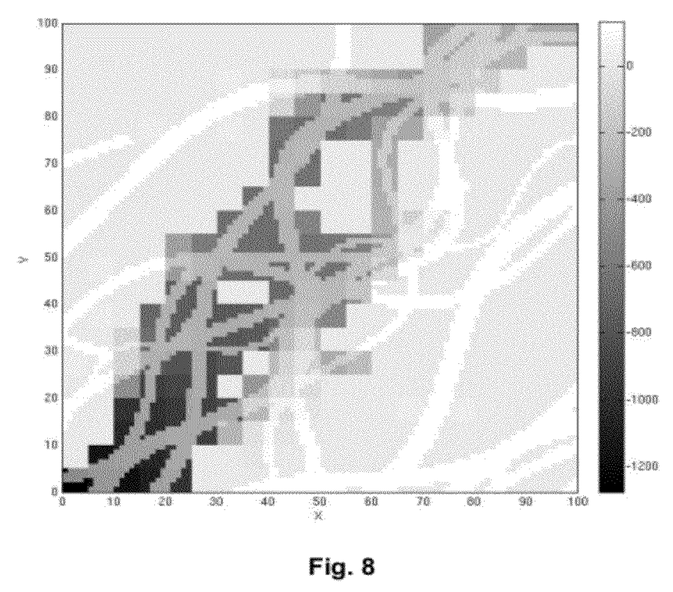
FIG. 8 shows the 3000-day impedance variations (in $g \cdot cm^{-3} \cdot m \cdot s^{-1}$) obtained in relation to the initial time by upscaling the petrophysical properties and by downscaling the pressure and saturation maps, where the values of a coarse cell are assigned to the underlying fine cells'
Figure 9:
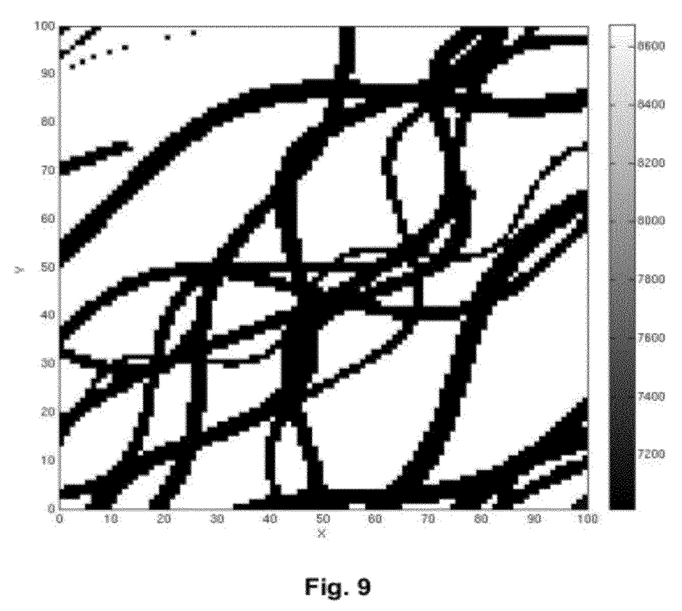
FIG. 9 shows the initial impedances (in $g \cdot cm^{-3} \cdot m \cdot s^{-1}$) obtained by upscaling the petrophysical properties and by downscaling the pressure and saturation maps with an algorithm of the invention.
Figure 10:
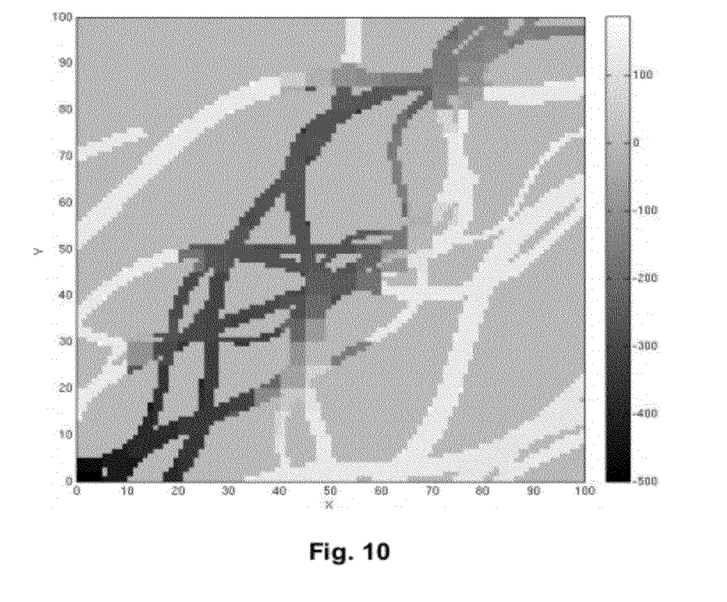
FIG. 10 shows the 3000-day impedance variations (in $g \cdot cm^{-3} \cdot m \cdot s^{-1}$) obtained in relation to the initial time by upscaling the petrophysical properties and by downscaling the pressure and saturation maps with the algorithm described in the invention.

To illustrate the method, a 2D reservoir is considered having two different lithofacies which are a sand and a shale. The lithofacies map is illustrated in FIG. 4 where the sand channels are shown in black and the shale in white. The shale is porous here, but its absolute permeability is zero. The relative permeability curves are identical for the two lithofacies, except for the residual water saturation, which is higher in the shale than in the sand. In these channels, a gas injection well (I) has been drilled, at the bottom left, and a production well (P) at the top right. The dimensions of the geological grid are $N_x=100$ and $N_y=100$. The grid used for the flow simulation has been magnified by a factor 5 in both spatial directions. FIGS. 5 and 6 show the P-type impedances (compressional waves) before development start and the differences after 3000 days. These values were calculated by performing the flow simulation on the geological grid (therefore without upscaling or downscaling). FIG. 6 shows the impedance drops due to the migration of gas in the channels. In the sandy regions that are not swept by the gas, an impedance increase linked with the pressure decrease resulting from production is observed. Outside, in the shale, the impedances keep their initial values. FIGS. 7 and 8 show the results obtained after upscaling the petrophysical properties and downscaling the pressure and saturation maps, by assigning simply the values of a cell of the flow grid to the underlying fine cells. As mentioned above, this downscaling type is not very accurate because it does not take account, in this case, of the presence of shale in some fine cells. Impedance drops are thus observed in the argillaceous cells where the gas cannot circulate. FIGS. 9 and 10 show the results obtained when using the two downscaling algorithms used in the invention. These algorithms calculate pressure and saturation variations only in the channels and they lead to seismic responses that are closer to those obtained by working directly on the fine model (compare with FIGS. 5, 6, 7, 8).

An objective function is considered of the form as follows:

$$OF = \frac{1}{2}\sum_{i=1}^{M}\omega_i\sum_{j=1}^{N_i}|d_{i,j}-\tilde{d}_{i,j}|^2$$

where:
M designates the number of dynamic data used for calibration,
$N_i$ is the number of measurements (time for a well datum, points for a grid datum) for a datum i,
$d_{i,j}$ is datum i simulated at a point j,
$\tilde{d}_{i,j}$ is the measurement associated with datum i at a point j, $$\omega_i = \frac{\alpha_i}{N_i\sigma_i^2}, \text{ with } \sigma_i^2$$

being the confidence interval associated with datum i, $\alpha_i$ a weight associated with the entire datum.

In order to quantify the error reduction obtained using the method according to the invention, the objective function which is defined above and the calculated impedances on the fine grid as reference data (see FIGS. 5 and 6) are used. With $\alpha_i=1$, $\sigma_i=811.158$ g·cm$^{-3}$·m·s$^{-1}$ for the initial impedances, $\sigma_i=2.881$ g·cm$^{-3}$·m·s$^{-1}$ for the differences after 3000 days, the objective function is:
2729 when applying directly the flow simulation results to the fine grid,
430 when using the invention.

The invention claimed is:

1. A method for optimizing development of an underground medium containing fluids, from a flow model including a first grid forming a set of cells discretizing the medium, wherein production data and seismic data associated with a second grid are measured during the development of the medium with each cell of first grid containing a set of cells of the second grid, comprising:
using a flow simulator implemented in software executed by a computer to simulate production data and pressure and saturation values in each cell of the first grid;
assigning a pressure value to each cell of the second grid;
assigning a saturation value to each cell in the second grid while carrying out for each cell of the first grid identifying zones of a set of connected cells of the second grid with each cell of identical lithofacies being a same rock type and determining, for each identified zone, a saturation value which is assigned to the cells of the zone by solving a first system of equations expressing a continuity of fluid flows between neighboring identified zones and a second system of equations expressing a conservation of a pore volume in each identified zone and a conservation of a volume of each fluid in the cells of the first grid;
simulating seismic data in the second grid using pressure and saturation values associated with each cell of the second grid; and
modifying the flow model to minimize a difference between the measured production data and the simulated production data and to minimize a difference between the measured seismic data and the simulated seismic data.

2. A method as claimed in claim 1, wherein the flow model is modified by modifying petrophysical property values associated with each cell of the second grid, which is used with the modified values to define an optimum development scheme for the underground medium and the underground medium is then developed according to the development scheme.

3. A method as claimed in claim 1, wherein the first system of equations involves only relative permeabilities of the fluids in each identified zone.

4. A method as claimed in claim 2, wherein the first system of equations involves only relative permeabilities of the fluids in each identified zone.

5. A method as claimed in claim 3, wherein the first system of equations is obtained by writing the following equation for each connected zone n:

$$\frac{kr_{\alpha 1,Rn}(S_{\alpha 1,Rn})}{kr_{\alpha 1,Rn}(S_{\alpha 1,Rn}) + kr_{\alpha 2,Rn}(S_{\alpha 2,Rn})} = \frac{kr_{\alpha 1,Rn+1}(S_{\alpha 1,Rn+1})}{kr_{\alpha 1,Rn+1}(S_{\alpha 1,Rn+1}) + kr_{\alpha 2,Rn+1}(S_{\alpha 2,Rn+1})}$$

with:
$kr_{\alpha,Rn}$ being relative permeability of fluid phase $\alpha$; and
$S_{\alpha,Rn}$ being saturation of fluid phase $\alpha$ in an identified zone $R_n$.

6. A method as claimed in claim 3, wherein the first system of equations is obtained by writing the following equation for each connected zone n:

$$\frac{kr_{\alpha 1,Rn}(S_{\alpha 1,Rn})}{kr_{\alpha 1,Rn}(S_{\alpha 1,Rn}) + kr_{\alpha 2,Rn}(S_{\alpha 2,Rn})} = \frac{kr_{\alpha 1,Rn+1}(S_{\alpha 1,Rn+1})}{kr_{\alpha 1,Rn+1}(S_{\alpha 1,Rn+1}) + kr_{\alpha 2,Rn+1}(S_{\alpha 2,Rn+1})}$$

with:
$kr_{\alpha,Rn}$ being relative permeability of fluid phase $\alpha$; and
$S_{\alpha,Rn}$ being saturation of fluid phase $\alpha$ in an identified zone $R_n$.

7. A method as claimed in claim 1, wherein the second system of equations is written as follows:

$$\begin{cases} \left(S_{\alpha 1,R1} \sum_{i \subset l, i \subset R1} Vol_i \cdot \phi_{f,i}\right) + \ldots + \left(S_{\alpha 1,Rn} \sum_{i \subset l, i \subset Rn} Vol_i \cdot \phi_{f,i}\right) = S_{\alpha 1,l} \cdot Vol_l \cdot \phi_{c,l} \\ \ldots \\ \left(S_{\alpha p,R1} \sum_{i \subset l, i \subset R1} Vol_i \cdot \phi_{f,i}\right) + \ldots + \left(S_{\alpha p,Rn} \sum_{i \subset l, i \subset Rn} Vol_i \cdot \phi_{f,i}\right) = S_{\alpha p,l} \cdot Vol_l \cdot \phi_{c,l} \\ \sum_p S_{\alpha p,R1} = 1 \\ \ldots \\ \sum_p S_{\alpha p,Rn} = 1 \end{cases}$$

with:
$\alpha 1, \ldots \alpha p$ being fluids 1 to p
R1, ... Rn being identified zones 1 to n
i being cells of the second grid included in a cell l of the first grid
$Vol_i$ being volume of a cell i of the second grid
$Vol_l$ being volume of a cell l of the first grid
$\phi_{f,i}$ being porosity of a cell i of the second grid
$\phi_{c,l}$ being porosity of a cell l of the first grid
$S_{\alpha,R}$ being saturation of fluid phase $\alpha$ in an identified zone R
$S_{\alpha,l}$ being saturation of fluid phase $\alpha$ in cell l, calculated by said flow simulation.

8. A method as claimed in claim 2, wherein the second system of equations is written as follows:

$$\begin{cases} \left(S_{\alpha 1,R1} \sum_{i \subset l, i \subset R1} Vol_i \cdot \phi_{f,i}\right) + \ldots + \left(S_{\alpha 1,Rn} \sum_{i \subset l, i \subset Rn} Vol_i \cdot \phi_{f,i}\right) = S_{\alpha 1,l} \cdot Vol_l \cdot \phi_{c,l} \\ \ldots \\ \left(S_{\alpha p,R1} \sum_{i \subset l, i \subset R1} Vol_i \cdot \phi_{f,i}\right) + \ldots + \left(S_{\alpha p,Rn} \sum_{i \subset l, i \subset Rn} Vol_i \cdot \phi_{f,i}\right) = S_{\alpha p,l} \cdot Vol_l \cdot \phi_{c,l} \\ \sum_p S_{\alpha p,R1} = 1 \\ \ldots \\ \sum_p S_{\alpha p,Rn} = 1 \end{cases}$$

with:
$\alpha 1, \ldots \alpha p$ being fluids 1 to p
R1, ... Rn being identified zones 1 to n
i being cells of the second grid included in a cell l of the first grid
$Vol_i$ being volume of a cell i of the second grid
$Vol_l$ being volume of a cell l of the first grid
$\phi_{f,i}$ being porosity of a cell i of the second grid
$\phi_{c,l}$ being porosity of a cell l of the first grid
$S_{\alpha,R}$ being saturation of fluid phase $\alpha$ in an identified zone R
$S_{\alpha,l}$ being saturation of fluid phase $\alpha$ in cell l, calculated by said flow simulation.

9. A method as claimed in claim 3, wherein the second system of equations is written as follows:

$$\begin{cases} \left(S_{\alpha 1,R1} \sum_{i \subset l, i \subset R1} Vol_i \cdot \phi_{f,i}\right) + \ldots + \left(S_{\alpha 1,Rn} \sum_{i \subset l, i \subset Rn} Vol_i \cdot \phi_{f,i}\right) = S_{\alpha 1,l} \cdot Vol_l \cdot \phi_{c,l} \\ \ldots \\ \left(S_{\alpha p,R1} \sum_{i \subset l, i \subset R1} Vol_i \cdot \phi_{f,i}\right) + \ldots + \left(S_{\alpha p,Rn} \sum_{i \subset l, i \subset Rn} Vol_i \cdot \phi_{f,i}\right) = S_{\alpha p,l} \cdot Vol_l \cdot \phi_{c,l} \\ \sum_p S_{\alpha p,R1} = 1 \\ \ldots \\ \sum_p S_{\alpha p,Rn} = 1 \end{cases}$$

with:
$\alpha 1, \ldots \alpha p$ being fluids 1 to p
R1, ... Rn being identified zones 1 to n
i being cells of the second grid included in a cell l of the first grid
$Vol_i$ being volume of a cell i of the second grid
$Vol_l$ being volume of a cell l of the first grid
$\phi_{f,i}$ being porosity of a cell i of the second grid
$\phi_{c,l}$ being porosity of a cell l of the first grid
$S_{\alpha,R}$ being saturation of fluid phase $\alpha$ in an identified zone R
$S_{\alpha,l}$ being saturation of fluid phase $\alpha$ in cell l, calculated by said flow simulation.

10. A method as claimed in claim 4, wherein the second system of equations is written as follows:

$$\begin{cases} \left(S_{\alpha 1,R1} \sum_{i \subset l, i \subset R1} Vol_i \cdot \phi_{f,i}\right) + \ldots + \left(S_{\alpha 1,Rn} \sum_{i \subset l, i \subset Rn} Vol_i \cdot \phi_{f,i}\right) = S_{\alpha 1,l} \cdot Vol_l \cdot \phi_{c,l} \\ \ldots \\ \left(S_{\alpha p,R1} \sum_{i \subset l, i \subset R1} Vol_i \cdot \phi_{f,i}\right) + \ldots + \left(S_{\alpha p,Rn} \sum_{i \subset l, i \subset Rn} Vol_i \cdot \phi_{f,i}\right) = S_{\alpha p,l} \cdot Vol_l \cdot \phi_{c,l} \\ \sum_p S_{\alpha p,R1} = 1 \\ \ldots \\ \sum_p S_{\alpha p,Rn} = 1 \end{cases}$$

with:

$\alpha 1, \ldots \alpha p$ being fluids 1 to p $R1, \ldots Rn$ being identified zones 1 to n i being cells of the second grid included in a cell l of the first grid $Vol_i$ being volume of a cell i of the second grid $Vol_l$ being volume of a cell l of the first grid $\phi_{f,i}$ being porosity of a cell i of the second grid $\phi_{c,l}$ being porosity of a cell l of the first grid $S_{\alpha,R}$ being saturation of fluid phase $\alpha$ in an identified zone R $S_{\alpha,l}$ being saturation of fluid phase $\alpha$ in cell l, calculated by said flow simulation.

11. A method as claimed in claim 5, wherein the second system of equations is written as follows:

$$\begin{cases} \left(S_{\alpha 1,R1} \sum_{i \subset l, i \subset R1} Vol_i \cdot \phi_{f,i}\right) + \ldots + \left(S_{\alpha 1,Rn} \sum_{i \subset l, i \subset Rn} Vol_i \cdot \phi_{f,i}\right) = S_{\alpha 1,l} \cdot Vol_l \cdot \phi_{c,l} \\ \ldots \\ \left(S_{\alpha p,R1} \sum_{i \subset l, i \subset R1} Vol_i \cdot \phi_{f,i}\right) + \ldots + \left(S_{\alpha p,Rn} \sum_{i \subset l, i \subset Rn} Vol_i \cdot \phi_{f,i}\right) = S_{\alpha p,l} \cdot Vol_l \cdot \phi_{c,l} \\ \sum_p S_{\alpha p,R1} = 1 \\ \ldots \\ \sum_p S_{\alpha p,Rn} = 1 \end{cases}$$

with:

$\alpha 1, \ldots \alpha p$ being fluids 1 to p $R1, \ldots Rn$ being identified zones 1 to n i being cells of the second grid included in a cell l of the first grid $Vol_i$ being volume of a cell i of the second grid $Vol_l$ being volume of a cell l of the first grid $\phi_{f,i}$ being porosity of a cell i of the second grid $\phi_{c,l}$ being porosity of a cell l of the first grid $S_{\alpha,R}$ being saturation of fluid phase $\alpha$ in an identified zone R $S_{\alpha,l}$ being saturation of fluid phase $\alpha$ in cell l, calculated by said flow simulation.

12. A method as claimed in claim 6, wherein the second system of equations is written as follows:

$$\begin{cases} \left(S_{\alpha 1,R1} \sum_{i \subset l, i \subset R1} Vol_i \cdot \phi_{f,i}\right) + \ldots + \left(S_{\alpha 1,Rn} \sum_{i \subset l, i \subset Rn} Vol_i \cdot \phi_{f,i}\right) = S_{\alpha 1,l} \cdot Vol_l \cdot \phi_{c,l} \\ \ldots \\ \left(S_{\alpha p,R1} \sum_{i \subset l, i \subset R1} Vol_i \cdot \phi_{f,i}\right) + \ldots + \left(S_{\alpha p,Rn} \sum_{i \subset l, i \subset Rn} Vol_i \cdot \phi_{f,i}\right) = S_{\alpha p,l} \cdot Vol_l \cdot \phi_{c,l} \\ \sum_p S_{\alpha p,R1} = 1 \\ \ldots \\ \sum_p S_{\alpha p,Rn} = 1 \end{cases}$$

with:

$\alpha 1, \ldots \alpha p$ being fluids 1 to p $R1, \ldots Rn$ being identified zones 1 to n i being cells of the second grid included in a cell l of the first grid $Vol_i$ being volume of a cell i of the second grid $Vol_l$ being volume of a cell l of the first grid $\phi_{f,i}$ being porosity of a cell i of the second grid $\phi_{c,l}$ being porosity of a cell l of the first grid $S_{\alpha,R}$ being saturation of fluid phase $\alpha$ in an identified zone R $S_{\alpha,l}$ being saturation of fluid phase $\alpha$ in cell l, calculated by said flow simulation.

13. A method as claimed in claim 1, wherein a pressure value is assigned to each cell of the second grid by partitioning the first grid into a set of connected subdomains and solving, for each subdomain, an equation of conservation of total volume of fluids in the cells of the second grid included in the subdomain.

14. A method as claimed in claim 2, wherein a pressure value is assigned to each cell of the second grid by partitioning the first grid into a set of connected subdomains and solving, for each subdomain, an equation of conservation of total volume of fluids in the cells of the second grid included in the subdomain.

15. A method as claimed in claim 3, wherein a pressure value is assigned to each cell of the second grid by partitioning the first grid into a set of connected subdomains and solving, for each subdomain, an equation of conservation of total volume of fluids in the cells of the second grid included in the subdomain.

16. A method as claimed in claim 4, wherein a pressure value is assigned to each cell of the second grid by partitioning the first grid into a set of connected subdomains and solving, for each subdomain, an equation of conservation of total volume of fluids in the cells of the second grid included in the subdomain.

17. A method as claimed in claim 5, wherein a pressure value is assigned to each cell of the second grid by partitioning the first grid into a set of connected subdomains and solving, for each subdomain, an equation of conservation of total volume of fluids in the cells of the second grid included in the subdomain.

18. A method as claimed in claim 6, wherein a pressure value is assigned to each cell of the second grid by partitioning the first grid into a set of connected subdomains and solving, for each subdomain, an equation of conservation of total volume of fluids in the cells of the second grid included in the subdomain.

19. A method as claimed in claim 7, wherein a pressure value is assigned to each cell of the second grid by partitioning the first grid into a set of connected subdomains and solving, for each subdomain, an equation of conservation of total volume of fluids in the cells of the second grid included in the subdomain.

20. A method as claimed in claim 8, wherein a pressure value is assigned to each cell of the second grid by partitioning the first grid into a set of connected subdomains and solving, for each subdomain, an equation of conservation of total volume of fluids in the cells of the second grid included in the subdomain.

21. A method as claimed in claim 9, wherein a pressure value is assigned to each cell of the second grid by partitioning the first grid into a set of connected subdomains and solving, for each subdomain, an equation of conservation of total volume of fluids in the cells of the second grid included in the subdomain.

22. A method as claimed in claim 10, wherein a pressure value is assigned to each cell of the second grid by partitioning the first grid into a set of connected subdomains and solving, for each subdomain, an equation of conservation of total volume of fluids in the cells of the second grid included in the subdomain.

23. A method as claimed in claim 11, wherein a pressure value is assigned to each cell of the second grid by partitioning the first grid into a set of connected subdomains and solving, for each subdomain, an equation of conservation of total volume of fluids in the cells of the second grid included in the subdomain.

24. A method as claimed in claim 12, wherein a pressure value is assigned to each cell of the second grid by partitioning the first grid into a set of connected subdomains and solving, for each subdomain, an equation of conservation of total volume of fluids in the cells of the second grid included in the subdomain.

25. A method as claimed in claim 13, wherein the conservation equation is written as follows:

$$\mathrm{div}(K_f(\eta_w+\eta_o+\eta_g)_{f,c}\nabla P)=0 \text{ in } \Omega_{loc}$$

$$P=P_{B_{loc}} \text{ in } B_{loc}$$

with:

$K_f$ being permeability defined on the second grid $\eta_{\alpha,f,c}$ being mobility of a fluid $\alpha$ $P_{B_{loc}}$ being pressure on a boundary $B_{loc}$ of subdomain $\Omega_{loc}$.

26. A method as claimed in claim 1, wherein:

if porosity of a cell of the second grid is lower than a first fixed threshold, no pressure value is assigned to the cell and flows with neighboring cells are considered to be zero; and if the permeability of a cell of the second grid is lower than a second fixed threshold, the cell is assigned a pressure value equal to a pressure before development of the medium and flows with neighboring cells are considered to be zero.

27. A method as claimed in claim 1, wherein:

if the porosity of an identified zone is lower than a first fixed threshold, no saturation value is assigned to the zone; and if the permeability of an identified zone is lower than a second fixed threshold, the zone is assigned a saturation value equal to a saturation before development of the medium.

* * * * *